United States Patent Office 2,919,724
Patented Jan. 5, 1960

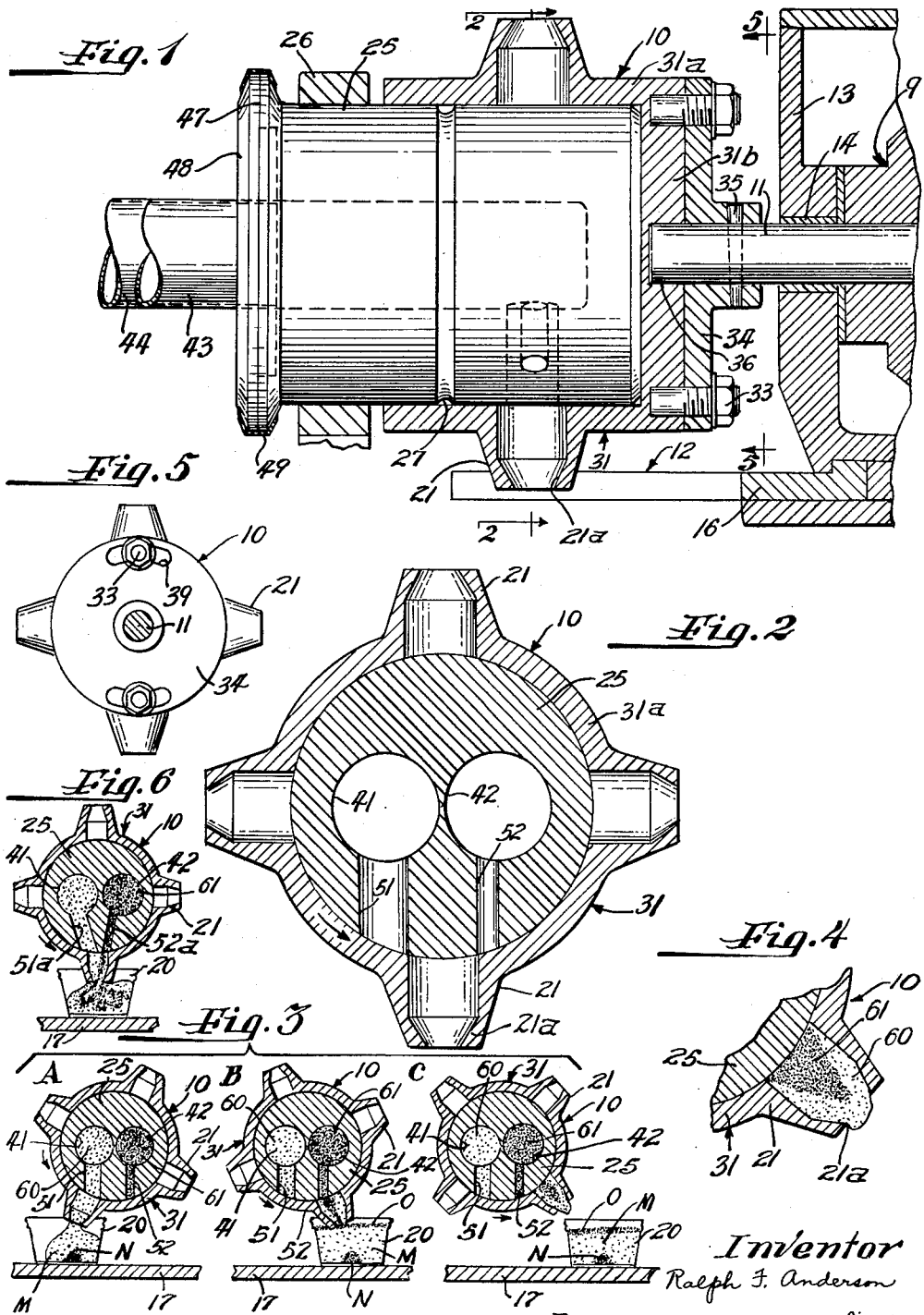

2,919,724

METHOD AND APPARATUS FOR DISPENSING FROZEN CONFECTION AND FLAVORING SYRUP

Ralph F. Anderson, Rockford, Ill.

Application May 26, 1958, Serial No. 737,877

10 Claims. (Cl. 141—9)

This invention relates to the dispensing of comestibles and particularly to a novel method and apparatus for filling cups with a frozen confection and a flavoring syrup.

In the packaging of frozen confection sundaes and the like, it has heretofore been the practice to employ one dispenser for dispensing the frozen confection into the cup and a separate dispenser for thereafter dispensing the syrup or other liquid condiment on top of the frozen confection. This requires duplication of the dispensing mechanism and thus increases the expense of manufacturing the machine. Of greater significance, however, is the difficulty in sharply terminating the flow of liquid syrup to prevent dripping onto the conveyor therebelow. The syrup is generally sticky and tends to collect around the tip of the dispensing nozzle during the dispensing operation and to drip from the nozzle after the flow from the nozzle is terminated.

An important object of this invention is to provide an improved method and apparatus for dispensing a frozen confection and a liquid syrup, in which dripping of the syrup from the dispenser is substantially completely eliminated.

Another object of this invention is to provide an improved method and apparatus for dispensing a frozen confection and a flavoring syrup into a cup in which the frozen confection and syrup are both dispensed through a single dispensing mechanism to thereby reduce the amount of equipment required for producing the frozen confection sundaes.

A more particular object of this invention is to provide an improved method and apparatus for dispensing a frozen confection and a flavoring syrup in which the frozen confection and syrup are dispensed through a nozzle whereby the frozen confection is operative to chill the syrup as it flows therethrough to thereby minimize dripping of syrup from the nozzle.

These, together with various ancillary objects and advantages of this invention will be more readily appreciated as the same becomes better understood by reference to the following detailed description when taken in connection with the accompanying drawings wherein:

Figure 1 is a side view of the filling device shown partially in section and partially in elevation;

Fig. 2 is a transverse sectional view through the filling device taken on the plane 2—2 of Figure 1;

Figs. 3A–3C are transverse sectional views through the filling device on a reduced scale and illustrating different operative positions thereof;

Fig. 4 is an enlarged fragmentary transverse sectional view through the filling device and illustrating the filler nozzle at the completion of the dispensing cycle;

Fig. 5 is a transverse sectional view of a reduced scale taken on the plane 5—5 of Figure 1, and Fig. 6 is a transverse sectional view through a modified form of filling device in which the frozen confection and flavoring syrup are arranged to be simultaneously dispensed into a cup to produce a marbleized effect.

Reference is now made more specifically to the accompanying drawings wherein there is illustrated a rotary filling head 10 for dispensing a frozen confection, such as ice cream, sherbet and the like, together with a flavoring syrup. As used herein, the term syrup includes condiments which are liquid or semi-liquid at normal room temperature, and which may contain solid pieces such as nuts, fruits and the like.

The filling head 10 is generally adapted for use on a filling machine of the type having a horizontally disposed drive shaft 11 and a conveyer 12 disposed therebelow and arranged to move the cups horizontally past the filler head. One suitable machine is disclosed and claimed in the copending application of Ralph F. Anderson and Marvin Heifetz, Serial No. 622,677, filed November 16, 1956, for "Cup Filler and Capper," now Patent No. 2,863,271, and assigned to the assignee of the present invention. In general, the filling mechanism disclosed in the aforementioned application includes a housing 13 having a bearing 14 therein for rotatably supporting the horizontally extending shaft 11. The conveyer 12 includes a star wheel 16 which is rotatably supported on the housing and driven in synchronism with the shaft 11 by a suitable gear mechanism 9 in the housing. As the star wheel 16 rotates, the containers 20 disposed in the pockets in the star wheel are advanced thereby across the support platform 17 along a path below the filler head 10. The filler head 10 is driven by the shaft 11 and, in the embodiment illustrated, has four annularly spaced nozzles. Accordingly, the mechanism which drivingly interconnects the star wheel and the shaft 11 is arranged so that the shaft 11 is angularly advanced through one-quarter turn in the time required for the star wheel to advance a distance corresponding to the angular spacing between adjacent pockets thereon.

The filler head 10 includes a stationary valve body 25 which is non-slidably and non-rotatably supported by means of a bracket 26 on a stationary support such as the housing 13. The valve body is formed with a smooth annular outer surface and is preferably formed with a collector groove 27 intermediate the ends thereof. A rotary valve member 31 is disposed around the stationary valve member and includes a cylindrical wall 31a and an end wall 31b. The end wall 31b overlies the inner end of the stationary valve member 25 and is attached as by fasteners 33 to a mounting flange 34 carried by the shaft 11. As best shown in Figure 1, the flange is non-rotatably connected to the shaft 11 by a pin 35 and the shaft extends into a recess 36 in the end wall 31b to center the rotary valve member. As shown in Fig. 5, the fasteners 33 extend through arcuate slots 39 in the flange 34 to permit limited angular adjustment of the rotary valve member with respect to the shaft 11.

The stationary valve body 25 has separate passages designated 41 and 42 formed therein and opening at the outer end of the stationary valve body. Supply conduits 43 and 44, respectively connected to a source of ice cream such as a continuous ice cream freezer and a source of syrup, are mounted to communicate with the passages 41 and 42 respectively. In the embodiment illustrated, the stationary body 25 has an outwardly extending flange 47 formed thereon and an attaching plate 48 is secured to the ends of the conduits 43 and 44 and detachably coupled to the flange 47 by means of an expansible band 49. Laterally extending passages 51 and 52 are also formed in the stationary valve body 25 and communicate at one end with a respective one of the passages 41 and 42 and open at the other end at the outer periphery of the stationary valve body.

The rotary valve member 31 closely surrounds the stationary valve body and normally blocks flow through the passages 51 and 52. However, each of the nozzles 21 on the rotary valve member are arranged to communicate with the open ends of the passages 51 and 52, as the rotary member is turned relative to the stationary valve body. Preferably, each of the nozzles 21 is made relatively short so as to minimize the distance through which the ice cream and syrup must pass after leaving the stationary valve body. The nozzles 21 are formed with a constricted end portion 21a to minimize dripping of the ice cream from the nozzle after the flow to the nozzle has been cut off.

The rotary valve member 31 is arranged to be rotated in a counterclockwise direction, as viewed in Figs. 2–4, relative to the stationary valve body and with this arrangement the ice cream and syrup conduits are connected so as to feed ice cream to the passage 41 and syrup to the passage 42. As is apparent, each of the nozzles 21 will first communicate with the lateral passage 51 to permit ice cream to flow through the nozzle into the cup 20 therebelow. In the embodiment illustrated in Figs. 1–5, the outer ends of the lateral passages 51 and 52 are angularly spaced apart a distance at least a distance equal to the inner diameter of the nozzles 21 so that the flow of ice cream to each of the nozzles is terminated before that nozzle communicates with the syrup passage 52. Consequently, syrup will thereafter be dispensed through each of the nozzles 21. The constricted end 21a on each of the nozzles maintains a quantity of semi-solid ice cream in the nozzle and the syrup which is thereafter passed through the nozzle is chilled as it contacts the ice cream. Since the syrup thickens substantially on contact with the cold ice cream, a sharp cut-off in the flow of syrup can be effected to minimize dripping.

The operation of this filler head is best illustrated in Figs. 3 and 4. The ice cream designated 60 flows through the axial passage 41 and lateral passage 51 when one of the nozzles 21 moves into registry with the outer end of the passage 51. Ice cream will then flow into the cup, which cup is simultaneously advanced by the aforementioned star wheel 16 below the nozzles and in the direction of movement thereof. As the outer member 31 is rotated, it reaches a position such as shown in Fig. 2 in which the nozzle is out of registry with the lateral passage 51, thereby terminating the flow of ice cream. Continued rotation of the rotary member 31 causes the nozzle to move into registry with the lateral passage 52 to thereby permit a quantity of syrup 61 to be dispensed through the nozzle 21 as shown in Fig. 3B. The size of the lateral passage 52 is preferably adjusted to regulate the rate of flow of syrup therethrough and thereby control the amount of syrup dispensed into the cup 20. Continued rotation of the outer member moves the nozzle to a position such as shown in Fig. 3C and Fig. 4 in which the nozzle is out of registry with both of the lateral passages 51 and 52. Since the lateral passage 52 is smaller than the nozzle 21, the syrup 61 does not completely fill the nozzle so that some ice cream 60 remains therein. This ice cream is effective to solidify and harden the syrup and tends to enclose the same as shown in Fig. 4 to minimize dripping of the syrup from the nozzle as it is rotated. This is particularly important in this type of filler wherein the nozzles rotate at a relatively high speed and centrifugal force tends to throw the confection outwardly. Since some confection 61 remains in the nozzle after flow therethrough is interrupted, a small quantity of the syrup will be delivered into the container 20 at the bottom, the next time that nozzle moves into registry with the lateral ice cream passage 51. The resultant packaged confection is as shown in Fig. 3 and includes a main body of ice cream M, a small quantity of confection or syrup N adjacent the bottom of the cup and a relatively larger layer of syrup O overlying the top of the ice cream.

In the embodiment illustrated in Fig. 6, the lateral passages in the stationary valve body designated 51a and 52a are arranged so that the outer ends thereof are spaced relatively close together and less than the inner diameter of the nozzles 21. Consequently, as the nozzles are rotated, they simultaneously communicate with the passages 51a and 52a during at least a portion of each revolution, as best shown in Fig. 6. With this arrangement, ice cream and syrup are simultaneously dispensed into the container 20 to provide a marbleized effect.

I claim:

1. The method of filling containers with a plastic frozen confection and a syrup comprising, passing a quantity of frozen confection through a nozzle sufficient to partially fill the container, terminating the flow of frozen confection to the nozzle, thereafter passing the syrup through the same nozzle to be chilled as it passes therethrough, and terminating the flow of syrup to the nozzle.

2. The method of filling containers with a plastic frozen confection and a syrup comprising, passing a quantity of frozen confection through a filling nozzle into a container, terminating the flow of confection to the nozzle, constricting the end of the nozzle to maintain a quantity of frozen confection therein, thereafter passing the flavored syrup through the frozen confection in the nozzle to be chilled thereby, and terminating the flow of confection to the nozzle.

3. The method of filling containers with a plastic frozen confection and a syrup comprising feeding a plastic frozen confection to a first orifice, feeding a syrup to a second orifice, and moving a nozzle relative to said orifices to sequentially communicate the nozzle with the first orifice and permit the frozen confection to pass through the nozzle, and thereafter communicating the nozzle with the second orifice to permit the syrup to flow through the nozzle and be chilled by the frozen confection therein.

4. The method of filling containers with a plastic frozen confection and a syrup comprising feeding a plastic frozen confection through a first stationary orifice, feeding a syrup through a second stationary orifice, moving a nozzle relative to said orifices into and out of communication therewith, and simultaneously moving a container below the nozzle to receive the frozen confection and syrup dispensed therethrough.

5. A multiple flavor rotary container filling device for plastic comestible comprising an annular stationary valve body having the axis thereof disposed substantially horizontal, said body having a plurality of separate passages extending thereinto and opening at the side of said body, means communicating with said passages for feeding different comestibles to each of said passages, a rotary valve member mounted on said body for rotation about the axis thereof and arranged to overlie the open ends of said passages to normally block flow therethrough, said rotary member having a plurality of delivery ports formed therein and each arranged to register with all of the open ends of said passages during each revolution of said rotary member whereby to dispense a plurality of different comestibles through each delivery port.

6. A device for filling containers with a plastic comestible and a syrup comprising an annular stationary valve body having the axis thereof disposed substantially horizontal, said body having a plurality of separate passages extending thereinto, said body having a plurality of separate orifices at the underside thereof and each communicating with a respective one of said passages, means communicating with one of said passages for feeding a frozen confection thereto for passage through said one of said passages and through one of said orifices, means communicating with a second one of said passages for feeding a syrup thereto for passage through said second passages and through a second one of said orifices, a rotary member disposed around said stationary member and supported thereon for rotation about the axis thereof, said rotary member having a plurality of relatively short nozzles thereon each arranged to register with said first and said second orifices in said stationary member during each revolution of said rotary member whereby the syrup passes through the frozen confection in the nozzle and is chilled thereby to substantially eliminate dripping of syrup from the nozzle.

7. The combination of claim 6 wherein said orifices are disposed relatively close together whereby said nozzle simultaneously communicates with all of said orifices.

8. The combination of claim 6 wherein said orifices are annularly spaced apart in the path of movement of said nozzles a distance greater than the flow area of said nozzles whereby to sequentially dispense the frozen comestible and the syrup through the nozzle into a container.

9. A rotary valve for dispensing plastic frozen confections and a syrup into a container comprising a stationary valve member having a plurality of separate passages therein opening at the underside thereof and defining separate orifices, a rotary valve member mounted on said stationary member for rotation relative thereto about a horizontal axis, said stationary valve member having a plurality of separate passages extending therethrough and opening at the underside thereof to define first and second orifices, means for feeding a plastic frozen condiment through one of said passages for flow therethrough to said first orifice, means for feeding a syrup to another of said passages for flow therethrough to said second orifice, said rotary valve member overlying said orifices to normally block flow therethrough and having a nozzle thereon adapted to register with said first and second orifices as said rotary member is turned relative to said stationary member, said second orifice having a flow area smaller than the flow area of said nozzle to prevent the syrup passing through the nozzle from displacing all of the frozen confection therefrom whereby the frozen confection in the nozzle is effective to chill the syrup and prevent the same from dripping from the nozzle.

10. The combination of claim 5 wherein said separate passages open at the side of said body in separate orifices annularly spaced apart in the path of rotation of said delivery port to sequentially dispense the different materials through the delivery port.

References Cited in the file of this patent

UNITED STATES PATENTS

| | | |
|---|---|---|
| 2,190,226 | Alexander | Feb. 13, 1940 |
| 2,639,678 | Martin | May 26, 1953 |